United States Patent Office 2,909,865
Patented Oct. 27, 1959

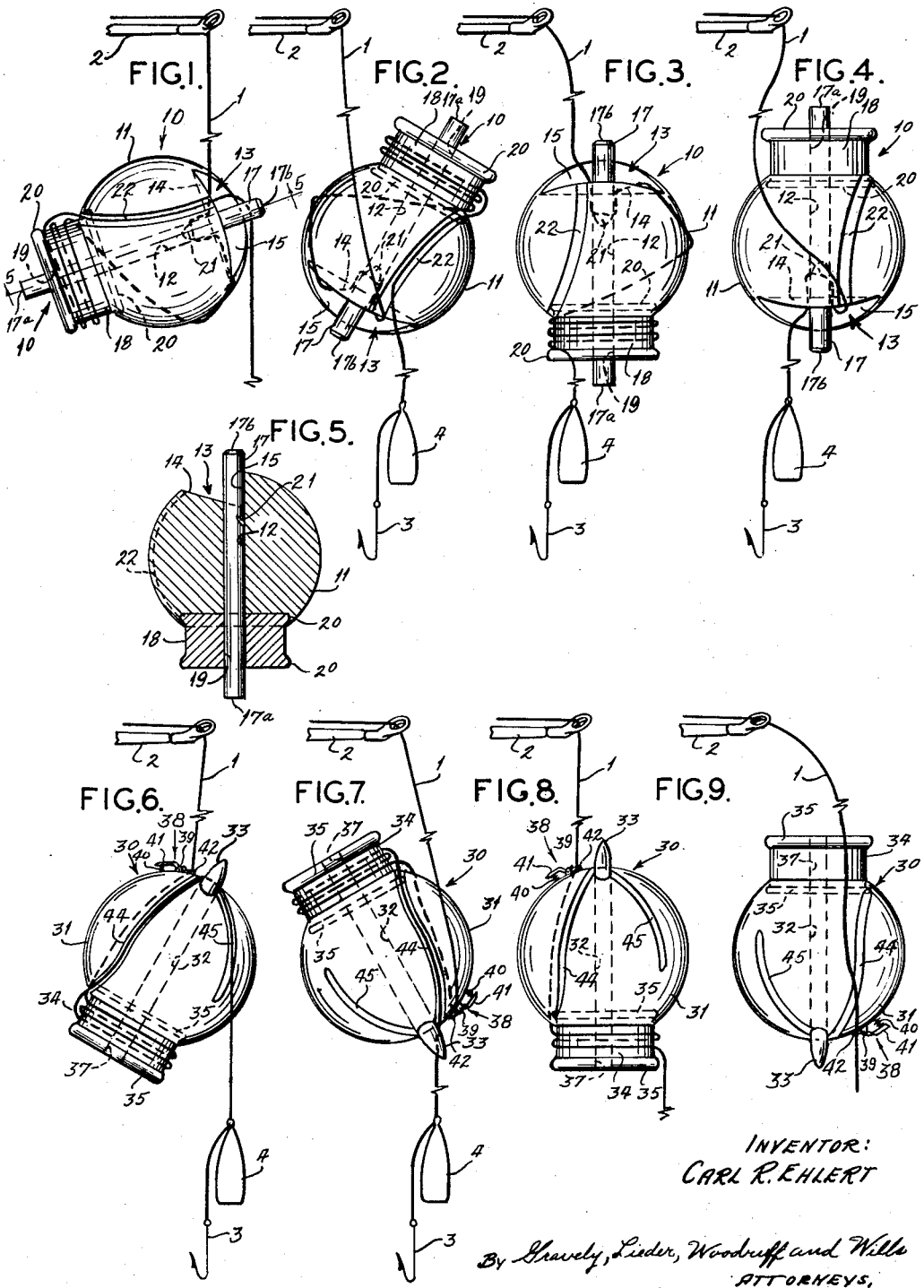

2,909,865

FISHING FLOAT

Carl R. Ehlert, Jacksonville, Ill.

Application June 10, 1955, Serial No. 514,645

1 Claim. (Cl. 43—43.11)

The present invention relates to fishing floats generally and particularly to fishing floats used with a fisherman's casting gear.

No provision has yet been made for a simplified fishing float for casting using a conventional bobber and spool that requires no special skill to assemble and use, and yet which may be employed with casting equipment where it is desirable to fish at predetermined depths. A float embodying the present invention can be prepared for casting more rapidly than prior floats because the fishing line need not be wound in a complex circuitous path onto the float.

One of the principal objects of the present invention is to provide a fishing float for casting that enables a fisherman to cast his bait over the water a considerable distance and permits the bait to automatically descend to the desired fishing depth.

Another object of the invention is to provide an inexpensive fishing float for use with casting gear which requires no special skill to assemble and use and which is made with conventional parts.

Another object of the invention is to provide a fishing float that is easily and quickly relocated on the fishing line for adjusting the fishing depth.

Still another object of the invention is to provide a fishing float that may be quickly and easily removed from the fishing line without having to disassemble any of the fishing gear.

A still further object of the invention is to provide a castable fishing float having means that prevent the fishing line from becoming tangled during casting.

Another object of the invention is the provision of a fishing float for use with casting gear that may be quickly and easily made ready for casting.

Other objects and advantages of the invention will become apparent by reference to the following detailed description in conjunction with the accompanying drawings, of which Fig. 1 is a side elevational view of a fishing float embodying the present invention shown in assembled relation with a casting rod and fishing line in condition for casting, Fig. 2 is a side elevational view of the same float on the surface of a body of water just after the float has alighted thereon, Fig. 3 is a side elevational view of the float on the surface of water showing the float's position as the fishing line unwinds from the spool portion, Fig. 4 is a side elevational view of the float resting on the surface of water in fishing condition after the fishing line has unwound from the spool portion, Fig. 5 is a cross-sectional view of the float taken along line 5—5 of Fig. 1, Fig. 6 is a side elevational view of a modified fishing float shown in assembled relation with a casting rod and fishing line in condition for casting, Fig. 7 is a side elevational view of the modified float shown in Fig. 6 on the surface of a body of water just after the float has alighted thereon, Fig. 8 is a side elevational view of the modified float showing the float's position as the fishing line unwinds from the spool portion, and Fig. 9 is a side elevational view of the modified fishing float resting on the surface of water in final fishing condition after the line has unwound from the spool portion.

Referring to the drawings in detail, the number 10 (Figs. 1, 2, 3 and 4) refers to a fishing float embodying the present invention. The float 10 includes a buoyant member 11, shown substantially spherical in shape. The buoyant member 11 may be made of cork, wood, hollow plastic or any other suitable buoyant material.

A bore 12 passes through the center of the buoyant member 11 and intersects a notch 13 therein. The notch 13 has two angularly related walls 14 and 15 arranged so that the bore 12 intersects the wall 14 and is tangential with the wall 15.

A longitudinal peg 17 is positioned in the bore 12 and extends therefrom past the wall 15. Because the wall 15 is tangential with the bore 12 the extension of the peg 17 will abut against the wall 15 and provide means between the peg 17 and wall 15 into which a fishing line 1 may be wedged for tight engagement with the float 10.

A cylindrical spool 18 is attached to the buoyant member 11 opposite to the notch 13. The spool 18 is provided with an axial bore 19 for slidably receiving one end of the peg 17. Annular flanges 20 circumscribe the ends of the spool 18 and define the boundaries thereon between which the fishing line 1 may be wound. One end of the spool 18 is shown imbedded in the buoyant member 11, however, the spool 18 may be tangential or formed integral with the buoyant member 11 as desired. The axial bore 19 in the spool 18 is in alignment with the bore 12 in the buoyant member 11. The peg 17 is positioned in the connected bores 12 and 19 so that when sufficient pressure is applied to either end 17a or 17b of the peg 17 in the direction of the float, the peg 17 will slide relative to said bores 12 and 19. The amount of pressure necessary to slide the peg 17 in the bores 12 and 19 should be as large as possible without causing the fisherman undue strain and yet be small enough to be quickly moved.

The peg 17 is provided with a tapered notch 21 that enters the wall of the peg 17 along one side and is tapered inwardly of the peg 17 in the general direction of the notch 13. The notch 21 preferably opens outwardly in the direction of the wall of the bore 12 on the same side thereof as the tangential wall 15 of the notch 13.

A groove 22 in the surface of the buoyant member 11 extends between the wall 14 of the notch 13 and the spool 18, and provides a path along which the fishing line 1 is guided when preparing the float for a cast. The groove 22 forms a trough that provides a simple guide means for holding the fishing line in a fixed position on the buoyant member 11 during casting.

The present fishing float 10 has its principal use with a casting rod 2 of the type which permits a fisherman to cast his bait a considerable distance. With a conventional fishing float, great difficulty is experienced during the casting operation because the reel (not shown) on the fishing rod 2 can only be wound up until the float reaches the tip of the rod 2. This means that the line 1 from the conventional float to the bait 3, including any sinkers 4, will dangle freely making casting very difficult, if not impossible especially as the fishing depth is increased. To overcome this difficulty, provision is made in the present float 10 to wind the line from the float 10 to the bait 3 or the sinker 4 onto the spool 18, thereby reducing the dangling part of the line 1 and facilitating the casting operation. When the float 10 strikes the water upon completion of a cast, the float 10 will rotate several times in succession permitting the bait 3 and the sinker 4 to lower automatically to the predetermined fishing depth.

To accomplish the above, the fishing line 1 is wound onto the reel until the float 10 is within easy grasp for the fisherman. The fisherman, if he is right handed, then places his rod 2 in a convenient spot and takes the float 10 in his left hand. Holding the float thus, he takes the fishing line 1 beyond the float to the bait 3 in his right hand, directing the line 1 around the buoyant member 11, and winds the line in a clockwise rotary motion onto the spool 18. As he nears the sinker 4 he directs the line 1 into the groove 22, which keeps the line from slipping on the buoyant member 11, and then allows the line to the bait 3 and sinker 4 to hang freely around the upper portion of the peg 17 (Fig. 1). The equipment is now in condition for casting.

After the fisherman has accomplished his cast and the float 10 has alighted on the water, the weight of the sinker 4 and the bait 3 descending in the water causes the float 10 to rotate. First, the float 10 rotates to a position with the spool 18 on top of the buoyant member 11 enabling the line going to the bait to become disengaged from the peg 17 (Fig. 2). Next (Fig. 3) the float 10 rotates approximately 180° to a position with the spool 18 beneath the buoyant member 11 in which position the line to the bait 3 is free to unwind itself automatically from the spool 18 and descend to the predetermined fishing depth. Finally (Fig. 4) when the line has completely unwound itself from the spool 18, the float 10 rotates a third time because of the weight of the bait 3 and sinker 4 to a position with the spool 18 on top. This results because the line from the rod 2 and from the bait 3 are attached to the float on the same side, which is the side opposite spool 18. The float 10 rides on the surface of the water in the final position giving a constant indication by its visibility or lack thereof of whether a fish has struck the bait.

When a fish strikes the bait causing the cork to vanish beneath the surface of the water, the fisherman winds in on his reel. Should the fishing depth be so great that the fish cannot be reeled in close enough for the fisherman to satisfactorily land, the fisherman can reach out and either jerk the float off the line or loosen the float on the line so that it will freely slide to the sinker 4 or the bait 3 thereon. Freeing the float 10 on the line is accomplished by pressing in on end 17a of the peg 17 adjacent the spool 18 so that the notch 21 in the peg 17 moves to a position adjacent the wall 15 of notch 13. The notch 21 and the wall 15 then provides a free-sliding path for the float 10 on the line 1. The fisherman is then able to wind the fish into a suitable position for landing. This feature of the present float 10 makes it particularly advantageous when large fish are being caught that must be brought in close for landing. It is also anticipated that the mere pull of a large enough fish will exert sufficient pressure on the line to draw the peg 17 out of the bores 12 and 19 far enough to permit the float 10 to slide along the line 1 toward the bait 3.

The weight of the sinker 4 and the bait 3 maintains the castable condition of the line when the float is out of water prior to casting, and prevents the inadvertent unwinding of the line from the float during casting. Thus, the weight of the sinker 4 and the bait 3 maintain the condition of the line 1 on the float 10 prior to casting, during casting, and also enable the line 1 to unwind from the float 10 once the float strikes the water after a cast.

The peg 17 may also be provided with a cross arm member (not shown) that moves in a groove in the buoyant member 11 (not shown) adjacent the bores 12 and 19 for maintaining the proper alignment between the peg 17 and the rest of the float. It is also anticipated that a spring (not shown) could be used with the peg 17 to bias the peg 17 into its operating condition. These features have not been found necessary for satisfactory operation under most conditions, however.

In Figs. 6, 7, 8 and 9 the number 30 refers to a modification of the float 10 hereinbefore described. The precise details differ in several respects but the modified float 30 serves the same need for fishermen and accomplishes its result in very much the same way.

The modified float 30 is provided with a spherical buoyant member 31 that has a diametral bore 32. A peg 33 positioned in the bore 32 extends from the opposite ends thereof. A spool 34 is provided having annular flanges 35 that define the boundaries whereon the fishing line 1 may be wound. A bore 37 along the axis of the spool 34 receives one end of the peg 33 in tight engagement. The spool 34 may be recessed into the buoyant member 31 as shown or be formed integral with either or both the buoyant member 31 or the peg 33.

The end of the peg 33 opposite the spool 34 projects from the buoyant member 31 and is rounded or suitably tapered for appearance. Various methods for fastening the line to the peg 33 or to the buoyant member 31 may be used. It may even be desirable in some instances not to fasten the line to the peg 33 or buoyant member 31 at all but just to run the line through the bore 32 holding it in place with the peg 33. However, in practice it is found to be more desirable in most instances to fasten the line to the float on the side opposite the spool 34 even when it is run through the bore 32 so that the line to the rod and the line to the bait will be fastened to the float 30 at points near each other.

In Figs. 6, 7, 8 and 9 a thumb operated clip 38 is shown for fastening the line 1 to the float 10. A suitable pivot pin 39 is provided about which the clip 38 pivots. A spring 40 is provided under one end 41 of the clip 38 to maintain the end 41 in an outward position relative the buoyant member 31. Another end 42 of the clip 38 is normally biased against the buoyant member 31. When thumb pressure is applied to the end 41, the clip pivots about the pivot pin 39 allowing the end 42 to rise above the surface of the buoyant member 31 so that the fishing line 1 may be inserted under the end 42. Releasing the thumb pressure on the clip 38 lowers the end 42 against the buoyant member 31 thereby securing the line to the float 30 and providing means for quickly freeing the line 1 for relocating or removing the float 30 therefrom. Any suitable fastening means may be used for this purpose.

A groove 44 and a groove 45 are provided in the surface of the buoyant member 31 and extend between the projecting end of the peg 33 and the spool 34. The grooves 44 and 45 prevent relative movement between the fishing line 1 and the buoyant member 31 during casting and make it easier to prepare the float 30. The groove 44 runs substantially the full distance from the peg 33 to the spool 34 along a smooth curve and the groove 45 extends from the projecting end of the peg 33 to a point about midway to the spool 34.

The modified float 30 is prepared for casting by securing the fishing line 1 to the float under the end 42 of the clip 38 at the desired fishing depth. The line to the bait is directed around the buoyant member 31 and wound onto the spool 34 in a rotary clockwise manner until only a small amount of line to the sinker 4 and bait 3 is left. The line is then guided along the groove 44, passed around the peg 33 and in front of the line to the rod and permitted to dangle freely from the groove 45. The equipment is now ready for casting.

When the cast is completed and the float 30 alights on the water, the descending sinker 4 and bait 3 bring the float 30 first to a position with the spool 34 on top (Fig. 7). This enables the line from the bait to disengage from the end of the peg 33. Next the float 30 rotates to a position with the spool 34 on the bottom permitting the line to the bait to unwind from the spool 34 as the bait descends. When the line on the spool has unwound the float will again rotate because the line 1 was fastened to the float 30 by the clip 38. The float 30 is now in position to indicate whether or not a fish is on the line.

The process used for preparing the floats 10 and 30 for casting, while detailed at some length herein, can actually be performed in a very short time.

The particular details of the float may be varied slightly without departing from the spirit of the device. For example, in the modified float the line may be clamped to the float 30 on the side opposite the spool 34 and also passed through the buoyant member 31 if desired.

It is also anticipated that the line may be tied to the float.

This invention is intended to cover all changes and modifications of the examples of the invention herein chosen for purposes of the disclosure, which do not constitute departures from the spirit and scope of the invention.

What I claim is:

A castable fishing float for shortening a fishing line during casting and for releasing a predetermined portion of line upon completion of a cast comprising a fishing line having a weighted bait adjacent one end thereof, a buoyant member having a bore therethrough, a peg positioned in said bore and extending from both ends thereof, a spool positioned on one end of said peg adjacent to the buoyant member, there being two angularly related grooves formed in the surface of said buoyant member, at least one of said grooves extending between the spool and the opposite end of said peg, one of said grooves guiding a portion of the fishing line from the spool to said opposite projecting end of the peg, said line extending around said opposite peg end, and said other groove guiding the line therefrom in suspended position from the float to a fishing bait, the fishing line opposite said suspended portion being wound around said spool a predetermined number of turns, and yieldable means for securing said line to the buoyant member at a preselected position, said yieldable fastening means being positioned on the buoyant member adjacent to said opposite end of said peg, the weight of the bait maintaining the float in said casting position with the spool in a downward position and shifting from said position on completion of a cast by overturning the float in the water with the spool portion up to release the line from said opposite end of the peg, and thereafter overturning the float to a position with the spool down to unwind said predetermined portion of the line and thereafter again overturning in the water so that the spool portion thereof extends upwardly out of the water.

References Cited in the file of this patent

UNITED STATES PATENTS

| | | |
|---|---|---|
| 729,687 | Smith | June 2, 1903 |
| 1,175,968 | Meiners | Mar. 21, 1916 |
| 2,581,260 | Keen | Jan. 1, 1952 |
| 2,593,524 | Bechnik | Apr. 22, 1952 |
| 2,603,905 | Brzezinski | July 22, 1952 |
| 2,760,295 | Bond | Aug. 28, 1956 |

FOREIGN PATENTS

| | | |
|---|---|---|
| 465,894 | France | 1914 |
| 800,436 | France | 1936 |